(12) United States Patent
Liao et al.

(10) Patent No.: US 11,721,886 B1
(45) Date of Patent: Aug. 8, 2023

(54) VEHICLE ANTENNA CAPABLE OF OPERATING IN MULTIPLE FREQUENCY RANGES AND AUTOMOBILE ANTENNA DEVICE

(71) Applicants: Futaijing Precision Electronics (Yantai) Co., Ltd., Yantai (CN); HON HAI PRECISION INDUSTRY CO., LTD., New Taipei (TW)

(72) Inventors: Chih-Wei Liao, New Taipei (TW); Ching-Ling Wu, New Taipei (TW); Hsiang-Neng Wen, New Taipei (TW); Yung-Yu Tai, New Taipei (TW); Jia-Hung Hsiao, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/708,168

(22) Filed: Mar. 30, 2022

(30) Foreign Application Priority Data

Feb. 22, 2022 (CN) .......................... 202210160250.6

(51) Int. Cl.
*H01Q 1/32* (2006.01)
*H01Q 5/307* (2015.01)
*H04W 4/40* (2018.01)

(52) U.S. Cl.
CPC ......... *H01Q 1/3275* (2013.01); *H01Q 1/3208* (2013.01); *H01Q 5/307* (2015.01); *H04W 4/40* (2018.02)

(58) Field of Classification Search
CPC .............................. H01Q 1/32; H01Q 1/3275
See application file for complete search history.

(56) References Cited

U.S. PATENT DOCUMENTS 9,899,733 B1 * 2/2018 Platt .......................... H01Q 1/42
2017/0054204 A1 * 2/2017 Changalvala ............ H01Q 1/42
(Continued)

FOREIGN PATENT DOCUMENTS

CN 110401035 A * 11/2019
CN 111710960 A * 9/2020
(Continued)

OTHER PUBLICATIONS

H. Su, L. L. Wu, Y. Zhang, H. L. Xu and X. Y. Zhang, "Analysis and Design of Filtering Series-Feed Omni-Directional Antenna for V2X Application," in IEEE Transactions on Antennas and Propagation, 2022, doi: 10.1109/TAP.2022.3209699. (Year: 2022).*
(Continued)

*Primary Examiner* — Ab Salam Alkassim, Jr.
*Assistant Examiner* — Leah Rosenberg
(74) *Attorney, Agent, or Firm* — ScienBiziP, P.C.

(57) ABSTRACT

A multi frequency ranges vehicle antenna able to transmit and receive over multiple frequencies including v2x includes a dielectric substrate, a first antenna, and second and third antennas. The first to third antennas are in parallel, vertically mounted, and are connected to the dielectric substrate. The first antenna is positioned between the second and third antennas. The first antenna is a 5G wideband antenna able to communicate in 2G, 3G, 4G, and 5G frequency bands, and the working frequency bands of the second and third antennas, which can work at the same time, are compatible with WiFi 6E and V2X frequency bands.

10 Claims, 8 Drawing Sheets

(56) References Cited

U.S. PATENT DOCUMENTS

2017/0093026 A1* 3/2017 Anderson ............ H01Q 1/2291
2022/0336951 A1* 10/2022 Tlusty ..................... H01Q 5/10

FOREIGN PATENT DOCUMENTS

| CN | 113113763 A | * | 7/2021 | ............... H01Q 1/32 |
| CN | 113196566 A | | 7/2021 | |
| KR | 101784706 B1 | * | 10/2017 | |

OTHER PUBLICATIONS

T. Smits, S. Suckrow, J. Christ and M. Geissler, "Active intelligent antenna system for car2car," 2013 International Workshop on Antenna Technology (iWAT), 2013, pp. 67-70, doi: 10.1109/IWAT.2013.6518300. (Year: 2013).*

O.-Y. Kwon, R. Song, Y.-Z. Ma and B.-S. Kim, "Integrated MIMO antennas for LTE and V2V applications," 2016 URSI Asia-Pacific Radio Science Conference (URSI AP-RASC), 2016, pp. 1057-1060, doi: 10.1109/URSIAP-RASC.2016.7601146. (Year: 2016).*

O.-Y. Kwon, R. Song and B.-S. Kim, "A Fully Integrated Shark-Fin Antenna for MIMO-LTE, GPS, WLAN, and WAVE Applications," in IEEE Antennas and Wireless Propagation Letters, vol. 17, No. 4, pp. 600-603, Apr. 2018, doi: 10.1109/LAWP.2018.2805681. (Year: 2018).*

C. Chen, H. Gan, H.-L. Peng, C. Peng, G.-H. Xu and J.-F. Mao, "High Performance V2X Antennas Designed in Integrated Shark-fin Environment," 2020 International Conference on Microwave and Millimeter Wave Technology (ICMMT), 2020, pp. 1-3, doi: 10.1109/ICMMT49418.2020.9386534. (Year: 2020).*

Q. Wu, Y. Zhou and S. Guo, "An L-Sleeve L-Monopole Antenna Fitting a Shark-Fin Module for Vehicular LTE, WLAN, and Car-to-Car Communications," in IEEE Transactions on Vehicular Technology, vol. 67, No. 8, pp. 7170-7180, Aug. 2018, doi: 10.1109/TVT.2018.2828433. (Year: 2018).*

B. Seungbok, K. Sangpil, H. Choulhee, K. Heeyoung, and K. Yoongi, "Design of a V2X Vehicle Antenna," 2018 International Symposium on Antennas and Propagation, Oct. 2018, retrieved from https://www.ieice.org/~isap/ISAP_Archives/2018/pdf/ThP-06.pdf (Year: 2018).*

* cited by examiner

VEHICLE ANTENNA CAPABLE OF OPERATING IN MULTIPLE FREQUENCY RANGES AND AUTOMOBILE ANTENNA DEVICE

FIELD

The subject matter herein generally relates to wireless communications, in particular relates to a multi frequency range vehicle antenna and a vehicle antenna device.

BACKGROUND

Between vehicles communication is complex and can utilizes traditional lines and 5G wireless transmission technology. New generation 5G mobile communication capability can make car infotainment systems as widely used as smart phones or tablets. In addition to 5G communication, vehicle networking (Vehicle-to-Everything, or v2x) in vehicle communication such as wireless local area network (WIFI) and BLUETOOTH (BT) must also be integrated into the communication environment for effective transmission of various data. At present, automobile antenna or aerials on vehicles, often a shark fin in appearance, is installed on body shells in vehicles. Due to the limited space, such an antenna in automobile is 4G antenna, and may not meet the needs of the vehicle system.

BRIEF DESCRIPTION OF THE DRAWINGS

Implementations of the present technology will now be described, by way of embodiments with reference to the attached figures.

DETAILED DESCRIPTION

Figure 1:
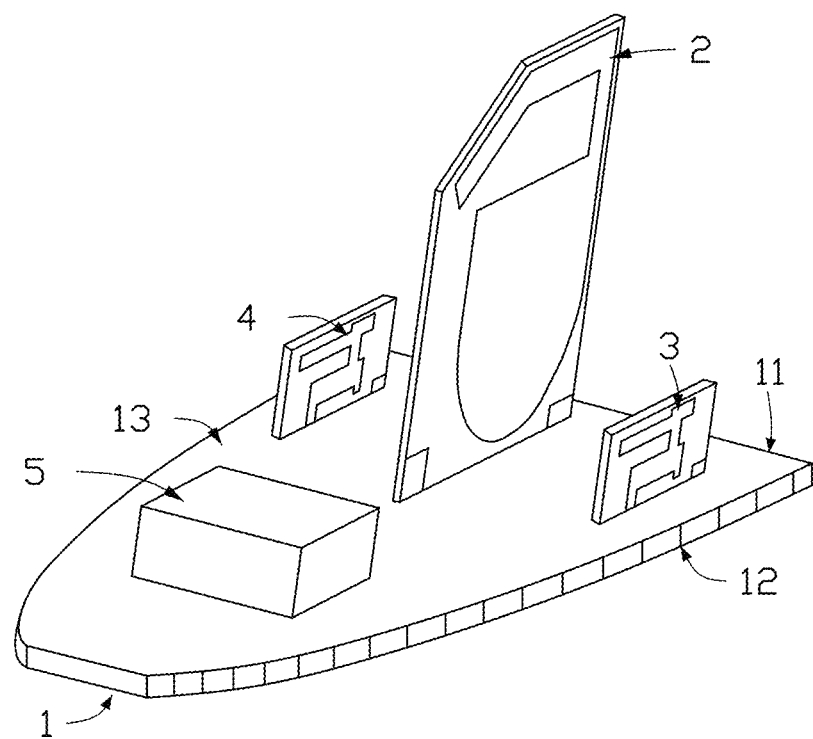
FIG. 1 is a structural diagram of a multiple frequency ranges vehicle antenna according to an embodiment of the present application.
Figure 2:
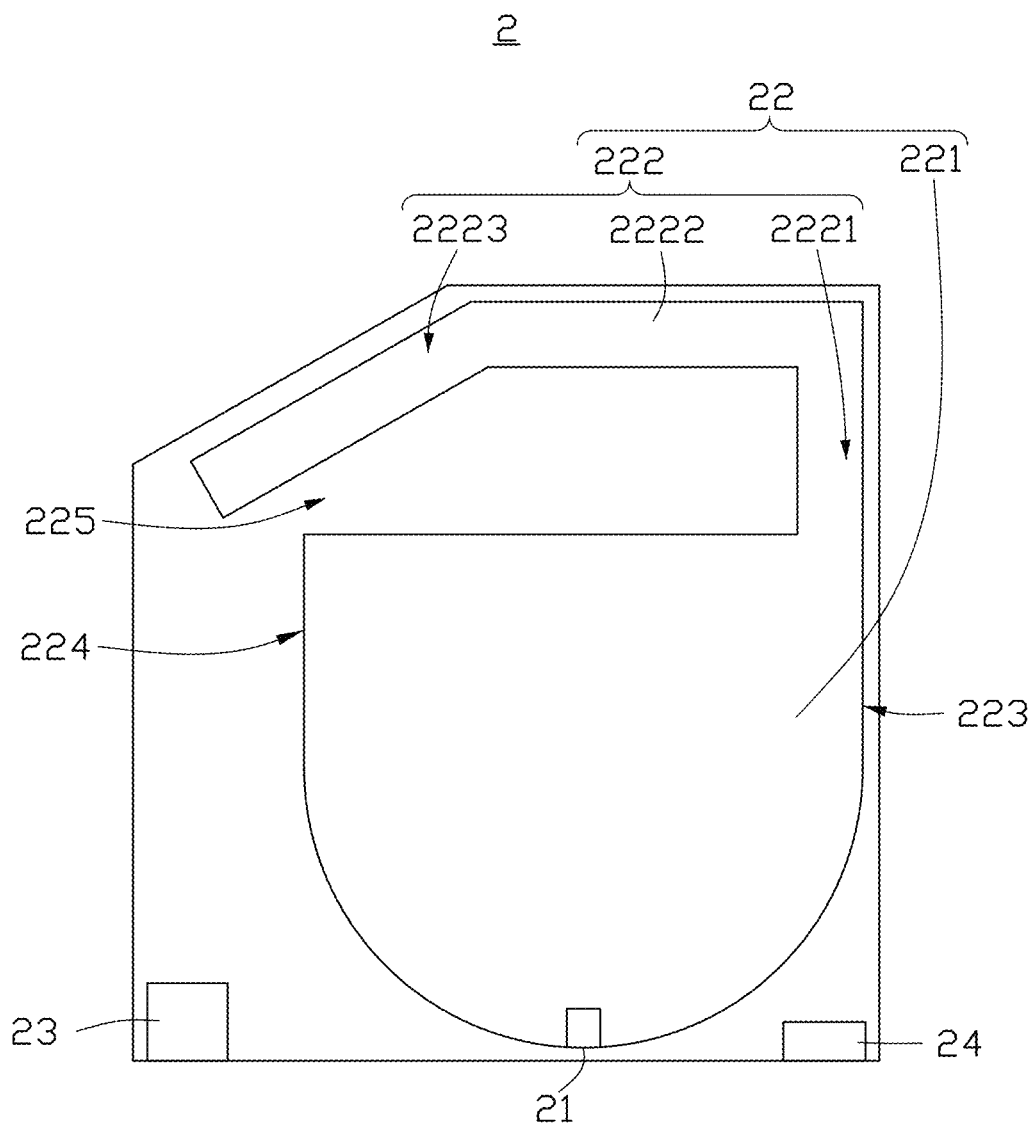
FIG. 2 is a schematic diagram of a first antenna in FIG. 1.
Figure 3:
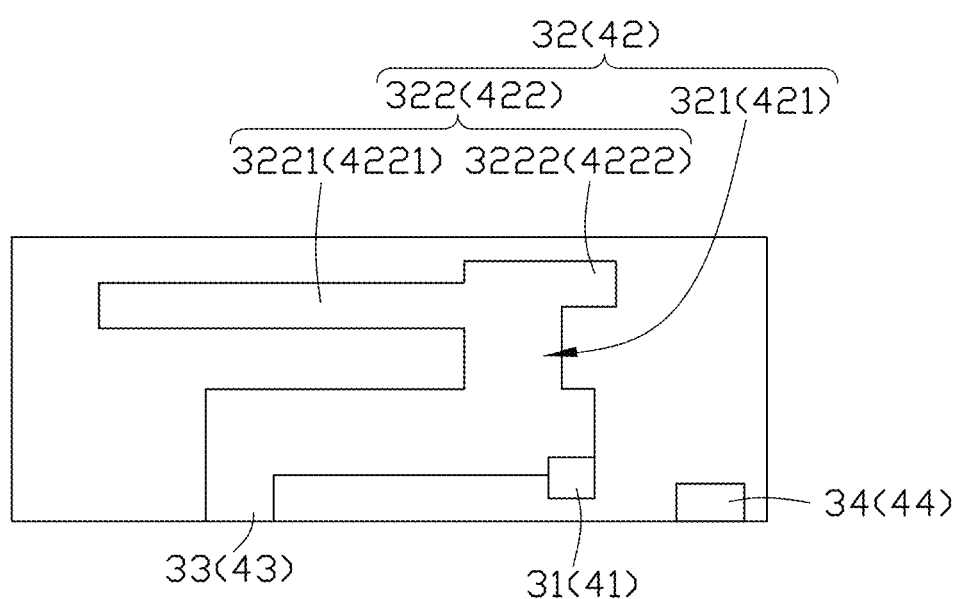
FIG. 3 is a schematic diagram of a second antenna or the third antenna in FIG. 1.
Figure 4:
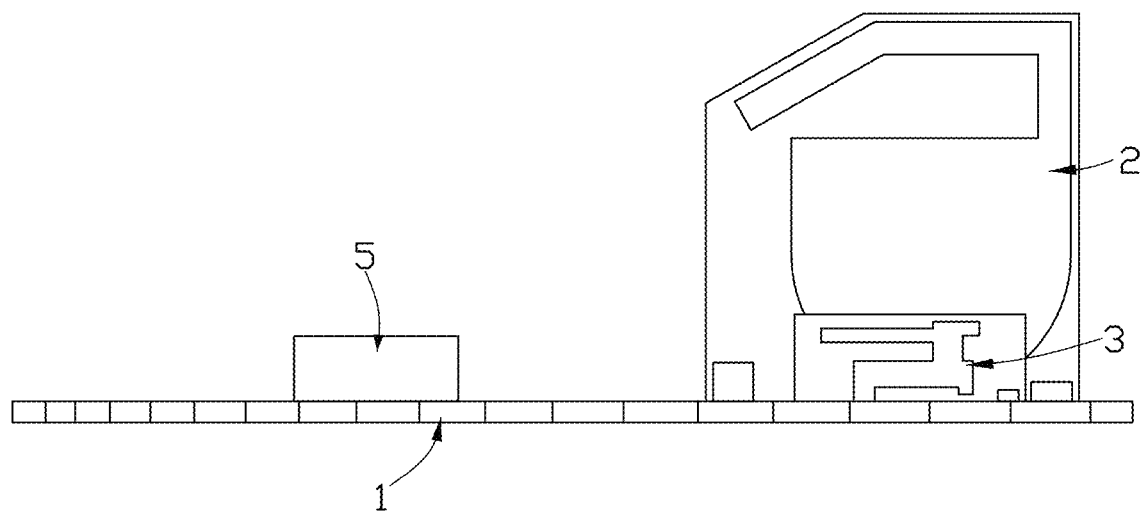
FIG. 4 is a front view of the multiple frequency ranges vehicle antenna in FIG. 1.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better show details and features of the present disclosure. The disclosure is by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. References to "a plurality of" and "a number of" mean "at least two".

Referring to FIGS. 1 to 4, the present application provides a vehicle antenna capable of using multiple frequency ranges (multiple frequency ranges vehicle antenna 100). The multi frequency ranges vehicle antenna 100 is arranged on or in an automobile, for a vehicle system to send and receive signals of multiple frequency ranges. The multi frequency ranges vehicle antenna 100 includes a dielectric substrate 1, a first antenna 2, a second antenna 3, and a third antenna 4. The first antenna 2, the second antenna 3, and the third antenna 4 are vertically connected to the dielectric substrate 1 and configured to electrically connect with at least one signal source (not shown in the figure), such as radio frequency modules. The first antenna 2, the second antenna 3, and the third antenna 4 are arranged in parallel, and the first antenna 2 is positioned between the second antenna 3 and the third antenna 4. Areas of the second antenna 3 and of the third antenna 4 are less than an area of the first antenna 2. The first antenna 2 is a 5G wideband antenna, working frequency bands of the first antenna 2 include 2G, 3G, 4G, and 5G frequency bands, working frequency bands of the second antenna 3 and the third antenna 4 are WIFI 6E. The second and third antennas 3 and 4 are compatible with V2X working frequency band at the same time. The multi frequency ranges vehicle antenna 100 also includes a positioning module 5, which is fixed on the dielectric substrate 1. The positioning module 5 can be a GNSS antenna integrated with a modular antenna for giving location of a vehicle carrying the multi frequency ranges vehicle antenna 100.

In an embodiment, the dielectric substrate 1 includes two opposite first sides 11 and two opposite second sides 12, the two opposite second sides 12 are connected between the two first sides 11. The first antenna 2, the second antenna 3, and the third antenna 4 are arranged adjacent to one of the first sides 11. The second and third antennas 3 and 4 are respectively arranged adjacent to opposite second sides 12 and are symmetrical about the first antenna 2.

The dielectric substrate 1 is a FR4 (Flame Retardant4) printed circuit board. The dielectric substrate 1 includes a grounding metal surface 13, the grounding metal surface 13 can be a copper-laid area on a printed circuit board. The dielectric substrate 1 includes a first signal feed line (not shown), a second signal feed line (not shown), and a third signal feed line (not shown) to electrically connect with the signal source. The first signal feed line, the second signal feed line, and the third signal feed line are respectively connected with the first to third antennas 2, 3, and 4.

Figure 5:
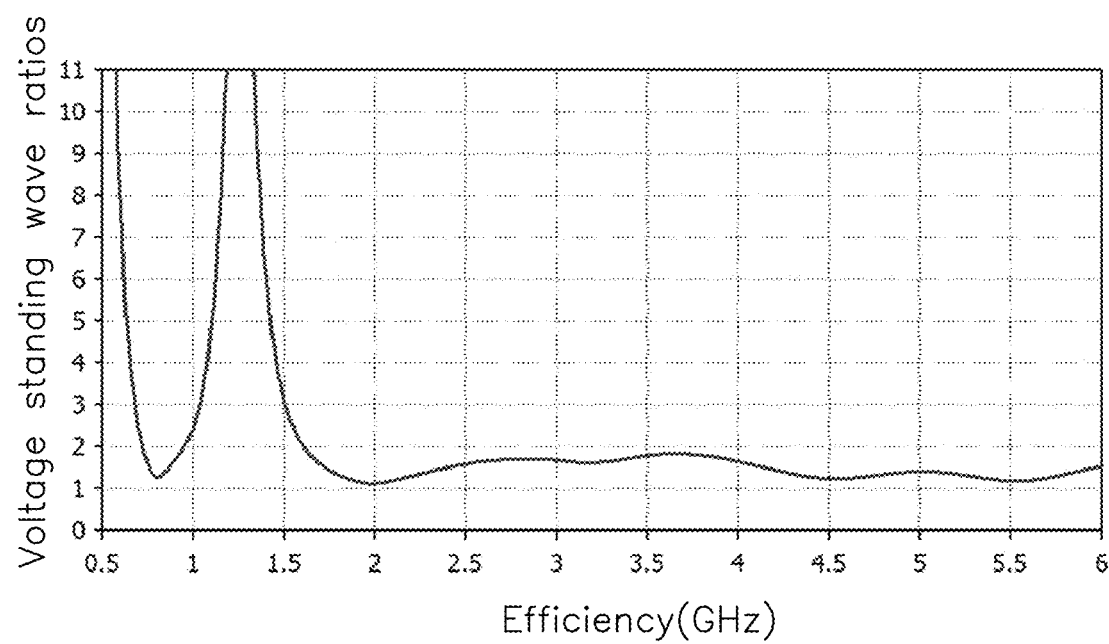
FIG. 5 shows a voltage standing wave ratio of the first antenna in FIG. 1.
Figure 7:
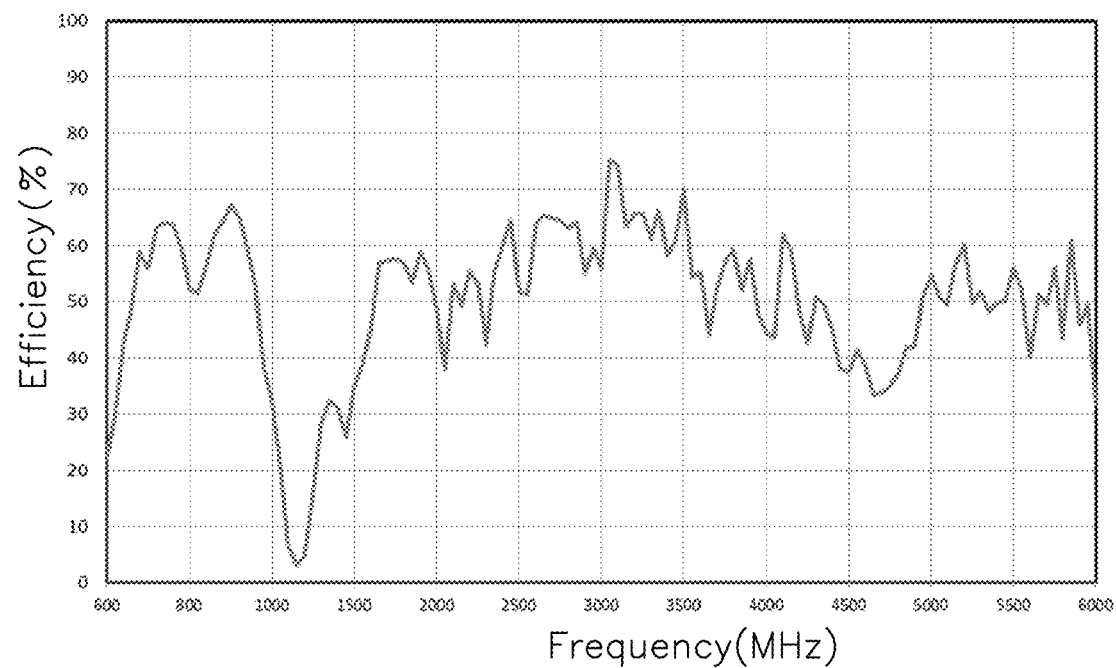
FIG. 7 shows a radiation efficiency curve of the first antenna in FIG. 1.

The first antenna 2 is a monopole, which is on a printed circuit board, this can be a single-sided FR-4 board. The first antenna 2 comprises a first feeding part 21, a first radiating part 22, and two first grounding parts 23 and 24. The first feeding part 21 is electrically connected to the first signal feeding line, and the first radiating part 22 is connected with the first feeding part 21. The first radiating part 22 includes a first resonance unit 221 and a second resonance unit 222. The second resonance part 222 is connected to one end of the first resonance part 221 away from the dielectric substrate 1. The second resonance part 222 includes a first sub resonance part 2221, a second sub resonance part 2222, and a third sub resonance part 2223. The first sub resonance part 2221 extends from a first edge 223 of the first resonance part 221 away from the dielectric substrate 1. The second sub resonance part 2222 is perpendicular to the first sub resonance part 2221 and extends towards a second edge 224 of the first resonance part 221 opposite to the first edge 223, so that an opening 225 is formed between the first resonance part 221 and the second resonance part 222. The third sub resonance part 2223 extends obliquely from an end of the second sub resonance part 2222 away from the first sub resonance part 2221 towards the first resonance part 221, and the third sub resonance part 2223 partially shields the opening 225. The two first grounding parts 23 and 24 are arranged at the bottom of the first antenna 2 and are connected with the grounding metal surface 13. The VSWR (voltage standing wave ratio) of the first antenna 2 is shown in FIG. 5, and the radiation efficiency curve of the first antenna 2 is shown in FIG. 7.

Figure 6:
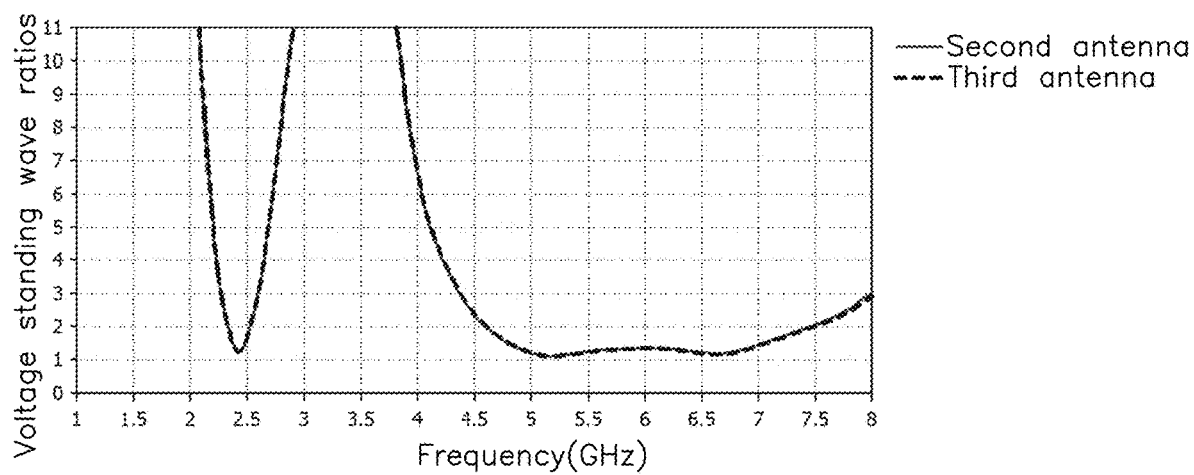
FIG. 6 shows voltage standing wave ratios of the second antenna and the third antenna in FIG. 1.
Figure 8:
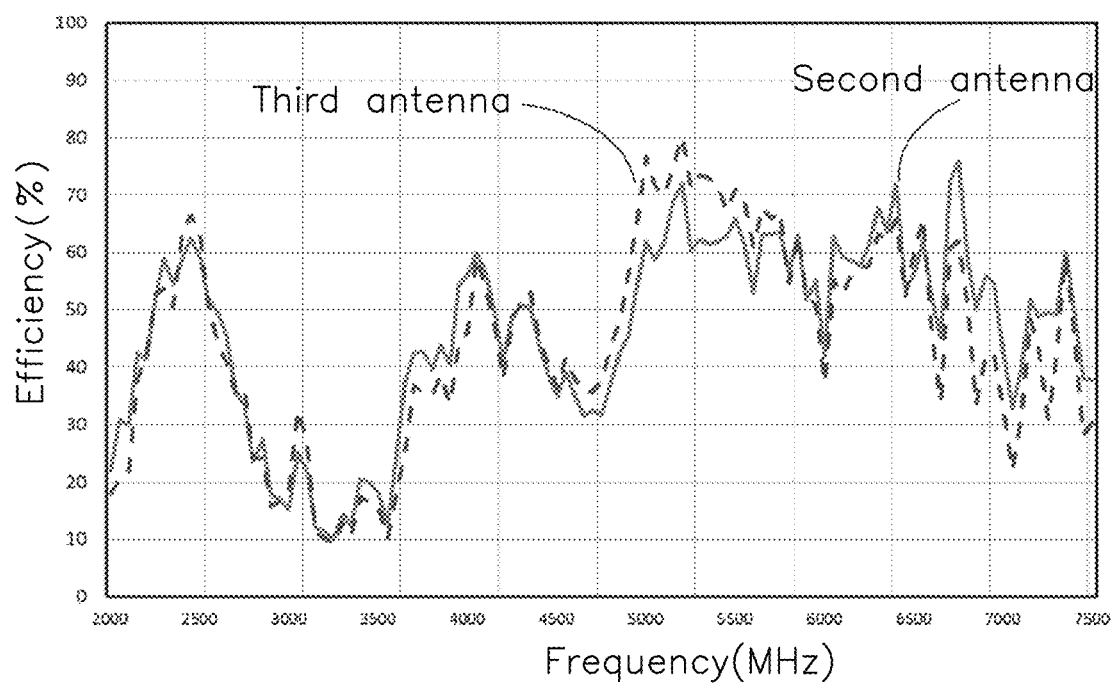
FIG. 8 shows radiation efficiency curves of the second antenna and the third antenna of the vehicle antenna in FIG. 1.

The second antenna 3 is a planar inverted-F antenna (PIFA), which is on a printed circuit board and can be a single-sided FR-4 board. A projection of the second antenna 3 in the direction towards the first antenna 2 falls completely on the first antenna 2. The second antenna 3 includes a second feeding part 31, a second radiating part 32, and two second grounding parts 33 and 34. The second feeding part 31 is electrically connected to the second signal feeding line, and the second radiating part 32 is connected with the second feeding part 31. The second radiating part 32 includes a third resonance part 321 and a fourth resonance part 322. The fourth resonance part 322 is connected to an end of the third resonance part 321 away from the dielectric substrate 1. The fourth resonance part 322 includes a fourth sub resonance part 3221 and a fifth sub resonance part 3222. The fourth sub resonance part 3221 and the fifth sub resonance part 3222 are perpendicular to the third resonance part 321. The fourth sub resonance part 3221 and the fifth sub resonance part 3222 extend in opposite directions from opposite sides of the third resonance part 321. The two second grounding parts 33 and 34 are arranged at a bottom of the second antenna 3 and are connected with the grounding metal surface 13. The VSWR of the second antenna 3 is shown in FIG. 6, and the radiation efficiency curve of the second antenna 3 is shown in FIG. 8.

The third antenna 4 is a planar inverted-F antenna (PIFA), which is on a printed circuit board and can be a single-sided FR-4 board. The projection of the third antenna 4 in the direction towards the first antenna 2 falls completely on the first antenna 2. The third antenna 4 includes a third feeding part 41, a third radiating part 42, and two third grounding parts 43 and 44. The third feeding part 41 is electrically connected to the third signal feeding line, and the third radiation part 42 is connected with the third feeding part 41. The third radiation part 42 includes a fifth resonance part 421 and a sixth resonance part 422. The sixth resonance part 422 is connected to an end of the fifth resonance part 421 away from the dielectric substrate 1. The sixth resonance part 422 includes a sixth sub resonance part 4221 and a seventh sub resonance part 4222. The sixth sub resonance part 4221 and the seventh sub resonance part 4222 are perpendicular to the fifth resonance part 421, the sixth sub resonance part 4221 and the seventh sub resonance part 4222 extend in opposite directions from opposite sides of the fifth resonance part 421. The two third grounding parts 43 and 44 are arranged at bottom of the third antenna 4 are connected with the grounding metal surface 13. The VSWR of the third antenna 4 is shown in FIG. 6, and the radiation efficiency curve of the third antenna 4 is shown in FIG. 8.

The application also provides an automobile antenna device. The automobile antenna device comprises the multi frequency ranges vehicle antenna 100.

The first antenna 2, the second antenna 3, and the third antenna 4 in the multi frequency ranges vehicle antenna 100 and automobile antenna device correspond to different working frequencies, including 2G, 3G, 4G, 5G, WiFi 6E, and v2x frequency ranges, which not only improves the network speed, but also meets the multi-directional communication requirements of the vehicle system. In addition, the multi frequency ranges vehicle antenna 100 has simple structure and is easy to produce, which reduces cost and has a light weight.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A multi frequency ranges vehicle antenna comprising:
 a dielectric substrate;
 a first antenna, a second antenna and a third antenna;
 wherein the first antenna, the second antenna and the third antenna are vertically connected to the dielectric substrate and configured to electrically connect with a signal source, the first antenna, the second antenna and the third antenna are arranged in parallel, and the first antenna is positioned between the second antenna and the third antenna, an area of each of the second antenna and the third antenna in a direction towards the first antenna is less than an area of the first antenna, the first antenna is a 5G wideband antenna, working frequency bands of the first antenna comprises 2G, 3G, 4G and 5G frequency bands, working frequency bands of the second antenna and the third antenna are WiFi 6E, and the second antenna and the third antenna is compatible with V2X working frequency band simultaneously;
 wherein the dielectric substrate is a FR4 printed circuit board, the dielectric substrate comprise a grounding metal surface, the dielectric substrate comprises a first signal feed line, a second signal feed line and a third signal feed line to electrically connect with the signal source, the first signal feed line, the second signal feed line and the third signal feed line are electrically connected with the first antenna, the second antenna and the third antenna respectively;

wherein the first antenna comprises a first feeding part, a first radiating part and two first grounding parts, the first feeding part is electrically connected to the first signal feeding line, and the first radiating part is connected with the first feeding part, the first radiating part comprises a first resonance unit and a second resonance unit, the second resonance part is connected to one end of the first resonance part away from the dielectric substrate;

wherein the second resonance part comprises a first sub resonance part, a second sub resonance part and a third sub resonance part, the first sub resonance part extends from a first edge of the first resonance part away from the dielectric substrate, the second sub resonance part is perpendicular to the first sub resonance part and extends towards a second edge of the first resonance part opposite to the first edge to form an opening between the first resonance part and the second resonance part, the third sub resonance part extends obliquely from an end of the second sub resonance part away from the first sub resonance part towards the first resonance part, the third sub resonance part partially shields the opening.

2. The multi frequency ranges vehicle antenna of claim 1, further comprises a positioning module fixed on the dielectric substrate.

3. The multi frequency ranges vehicle antenna of claim 1, wherein the first antenna is a monopole, the first antenna is on printed circuit board and is a single-sided FR-4 board.

4. The multi frequency ranges vehicle antenna of claim 1, wherein the second antenna comprises a second feeding part, a second radiating part and two second grounding parts, the second feeding part is electrically connected to the second signal feeding line, and the second radiating part is connected with the second feeding part, the second radiating part comprises a third resonance part and a fourth resonance part, the fourth resonance part is connected to an end of the third resonance part away from the dielectric substrate, the fourth resonance part comprises a fourth sub resonance part and a fifth sub resonance part, the fourth sub resonance part and the fifth sub resonance part are perpendicular to the third resonance part, the fourth sub resonance part and the fifth sub resonance part extend from opposite sides of the third resonance part toward two opposite directions.

5. The multi frequency ranges vehicle antenna of claim 1, wherein a projection of the second antenna in the direction towards the first antenna completely falls on the first antenna.

6. An automobile antenna device comprises:
a multi frequency ranges vehicle antenna comprising:
a dielectric substrate;
a first antenna, a second antenna and a third antenna;
wherein the first antenna, the second antenna and the third antenna are vertically connected to the dielectric substrate and configured to electrically connect with a signal source, the first antenna, the second antenna and the third antenna are arranged in parallel, and the first antenna is positioned between the second antenna and the third antenna, an area of anyone of the second antenna and the third antenna in a direction towards the first antenna is less than an area of the first antenna, the first antenna is a 5G wideband antenna, working frequency bands matched with the first antenna comprises 2G, 3G, 4G and 5G frequency bands, working frequency bands matched with the second antenna and the third antenna are WiFi 6E, and the second antenna and the third antenna is compatible with V2X working frequency band simultaneously;

wherein the dielectric substrate is a FR4 printed circuit board, the dielectric substrate comprise a grounding metal surface, the dielectric substrate comprises a first signal feed line, a second signal feed line and a third signal feed line to electrically connect with the signal source, the first signal feed line, the second signal feed line and the third signal feed line are electrically connected with the first antenna, the second antenna and the third antenna respectively;

wherein the first antenna comprises a first feeding part, a first radiating part and two first grounding parts, the first feeding part is electrically connected to the first signal feeding line, and the first radiating part is connected with the first feeding part, the first radiating part comprises a first resonance unit and a second resonance unit, the second resonance part is connected to one end of the first resonance part away from the dielectric substrate;

wherein the second resonance part comprises a first sub resonance part, a second sub resonance part and a third sub resonance part, the first sub resonance part extends from a first edge of the first resonance part away from the dielectric substrate, the second sub resonance part is perpendicular to the first sub resonance part and extends towards a second edge of the first resonance part opposite to the first edge to form an opening between the first resonance part and the second resonance part, the third sub resonance part extends obliquely from an end of the second sub resonance part away from the first sub resonance part towards the first resonance part, the third sub resonance part partially shields the opening.

7. The automobile antenna device of claim 6, wherein the multi frequency ranges vehicle antenna further comprises a positioning module fixed on the dielectric substrate.

8. The automobile antenna device of claim 6, wherein the first antenna is a monopole, the first antenna is on printed circuit board and is a single-sided FR-4 board.

9. The automobile antenna device of claim 6, wherein the second antenna comprises a second feeding part, a second radiating part and two second grounding parts, the second feeding part is electrically connected to the second signal feeding line, and the second radiating part is connected with the second feeding part, the second radiating part comprises a third resonance part and a fourth resonance part, the fourth resonance part is connected to an end of the third resonance part away from the dielectric substrate, the fourth resonance part comprises a fourth sub resonance part and a fifth sub resonance part, the fourth sub resonance part and the fifth sub resonance part are perpendicular to the third resonance part, the fourth sub resonance part and the fifth sub resonance part extend from opposite sides of the third resonance part toward two opposite directions.

10. The automobile antenna device of claim 6, wherein a projection of the second antenna in the direction towards the first antenna completely falls on the first antenna.

* * * * *